O. C. TRAVER.
PROTECTION OF PARALLEL FEEDERS.
APPLICATION FILED MAR. 3, 1917.

1,297,935.    Patented Mar. 18, 1919.

Inventor:
Oliver C. Traver,
by Albert G. Davis
His Attorney.

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

PROTECTION OF PARALLEL FEEDERS.

1,297,935.  Specification of Letters Patent.  Patented Mar. 18, 1919.

Application filed March 3, 1917. Serial No. 152,297.

*To all whom it may concern:*

Be it known that I, OLIVER C. TRAVER, a citizen of the United States, residing at Schenectady, in the county of Schenectady, State of New York, have invented certain new and useful Improvements in the Protection of Parallel Feeders, of which the following is a specification.

My invention relates to the protection of parallel feeders and has for its object to provide means for protecting any number of feeders in parallel, whereby upon the occurrence of a fault on any of said feeders, the feeder at fault is selected and its circuit opened without disturbing continuity of service on the remaining feeders.

Various schemes proposed for protecting a plurality of feeders in parallel, especially such schemes as depend upon potential, are not operative to select and open the circuit of a feeder at fault under all conditions which may occur without discontinuing service on healthy feeders and such schemes become complicated when three or more feeders must be protected. By my invention, I provide a protective scheme which is applicable to any number of parallel feeders, which does not depend for its operation on potential, which is simple, not liable to get out of order and which accurately selects the feeder at fault under all conditions of trouble.

Figure 1:
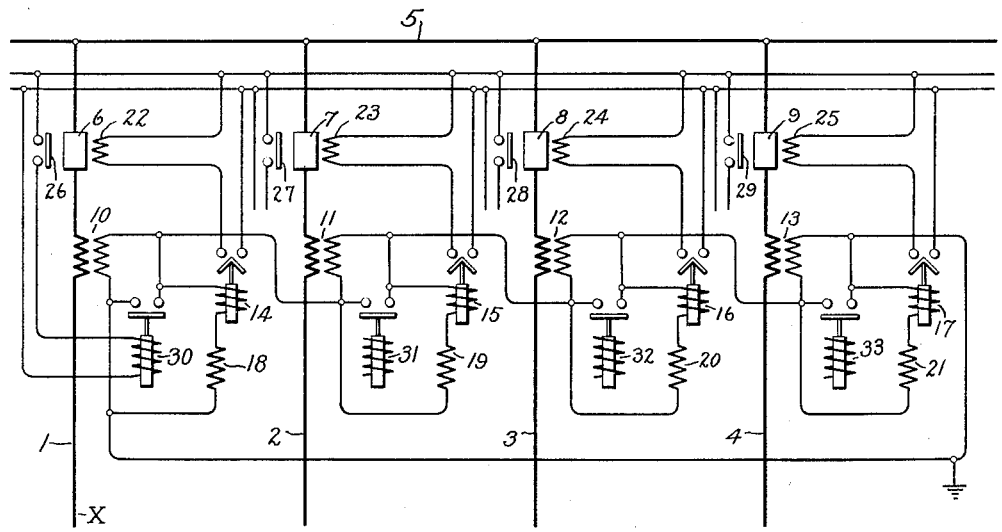
Figure 2:
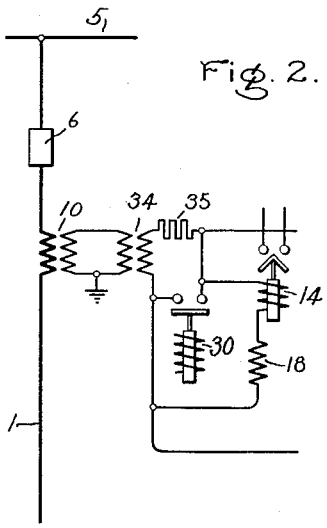

The novel features which I believe to be characteristic of my invention will be definitely indicated in the claims appended hereto while the features of construction and mode of operation will be understood by reference to the following description taken in connection with the accompanying drawing which shows the preferred embodiment of my invention and in which:

Figure 1 shows diagrammatically a system comprising a plurality of parallel feeders embodying my invention, and Fig. 2 shows diagrammatically a portion of the system shown in Fig. 1 embodying a modified form of my invention.

In Fig. 1 I have shown, by way of illustration, my invention embodied in a system comprising four parallel feeders 1, 2, 3, 4 connected to a common bus 5 through suitable switches 6, 7, 8, 9, respectively, and, for purposes of clearness, I have shown the system in one line diagram only. For selectively controlling the circuits of the parallel feeders, I provide a protective scheme comprising transformers 10, 11, 12, 13 operatively related to the feeders 1, 2, 3 and 4 respectively, the secondaries of these transformers being connected in series to form a low resistance loop circuit, which is inductively related to all the feeders. By this or other suitable connections, I arrange the secondaries of the transformers in load balancing relation or in such a manner that the effect of load conditions on the feeders is balanced or canceled out. Although I have shown only one loop circuit which is operatively related to similar phases of the feeders, it is understood that similar loop circuits are operatively related to the other similar phases of the feeders. In the loop circuit shown, which I prefer to ground at one point for matters of safety I connect in shunt to each of the secondaries of transformers 10, 11, 12 and 13 a fault responsive or control means for controlling the opening of their respective feeders. The control means for each feeder comprises electroresponsive devices or relays 14, 15, 16 and 17, preferably of the current responsive or overload type, operative either instantaneously or with a time limit action. On systems subject to heavy fault currents, I may connect in series with my control devices reactance coils 18, 19, 20 and 21, respectively. From the connections shown, it is apparent that in the loop circuit, each control means is in shunt to its respective transformer secondary and in shunt to all the other control means in series. By this arrangement the control means will accurately select the faulty feeder under all conditions as will be hereinafter described. The control means operate to close the circuits of trip coils 22, 23, 24, 25 for the feeder switches 6, 7, 8, 9, respectively, to thereby disconnect their respective feeders.

Associated with and operatively related to each feeder switch 6, 7, 8 and 9, are auxiliary switches 26, 27, 28 and 29, respectively, for controlling a low resistance shunt for said control means. These switches are maintained open while their respective feeder switches are closed and are closed in response to the opening of their respective feeder switches. The auxiliary switches 26, 27, 28 and 29 control the circuits of relay devices 30, 31, 32 and 33, respectively, which relay devices are in circuit opening position while their respective auxiliary switches are open but are energized in response to the closing of their respective auxiliary switches to short circuit both their respective transformer secondaries and the control devices. It is understood that the use of auxiliary switches is only one way of accomplishing this function, and what I have provided is broadly, means responsive to the opening and closing of the feeder circuits for closing and opening respectively the circuits of the respective relay devices 30, 31, 32 and 33.

The operation of my device may be described as follows: In Fig. 1 under normal operating conditions with the four feeders 1, 2, 3 and 4 in service, the relay devices 30, 31, 32, 33 are all open and the load currents induced in the secondaries of the transformers 10, 11, 12 and 13, which are of substantially the same impedance, flow around the loop circuits through the secondaries in series so that the effect of load currents in the loop circuit is canceled or balanced out.

Practically no load current flows through the shunt paths including the control devices as these shunt paths are of too high impedance. The control devices 14, 15, 16 and 17 are unresponsive to load or balanced currents and are operative only in response to fault or unbalanced currents. Due to the fact that the effect of the load currents in the loop circuit is always balanced out, the control means is unaffected by the load currents and operates under conditions similar to those of no load on the feeders.

Assume that bus 5 is one at a receiving station and a fault occurs on one feeder, for instance on feeder 1 at the point X. An increased current flows on feeders 2, 3 and 4, due to the fault, which increased current is considered as fault current, the fault currents on the feeders combining and flowing out feeder 1 to the fault. The fault currents are, therefore, in one direction on the healthy feeders 2, 3 and 4 and in the opposite direction as the faulty feeder 1. Depending upon the value of the fault current, a reversal may or may not occur on the end of feeder 1. The fault currents on feeders 2, 3 and 4 are substantially equal and depend in value upon the character of the fault and upon the operating conditions of the system.

As the control means 14 for the faulty feeder 1 is in shunt to a circuit including the control means 15, 16 and 17 in series, the fault current in the loop divides and, in the case of four feeders, three-fourths of the fault current flows through the control means of the faulty feeder, comprising relay 14 and its reactance coil 18, while one-fourth flows through each of the control means of the other feeders. The faulty feeder control means 14, therefore, takes three times more current than either of the other feeders. The fault currents passing through the control means 15, 16 and 17 of the healthy feeders 2, 3 and 4, respectively, are, therefore, not sufficient to operate their control means, while the fault current through the control means 14 of feeder 1 operates the control means 14 to close the circuit of trip coil 22 and automatically open the switch 6 thus opening the circuit of the faulty feeder 1. When the switch 6 opens, its auxiliary switch 26 operates to close the circuit of the short circuiting means or electroresponsive device 30 which thereupon closes its contacts to short circuit or remove from the loop circuit both the secondary of transformer 10 and the control means 14 with its reactive coil 18, thus maintaining the loop circuit of low resistance, with the effects of the load currents induced from the remaining feeders balanced out.

Under some conditions, such as those causing heavy current in the system, the fault current may be of such a value that the one quarter passing through the control means corresponding to the healthy feeders is sufficient to operate the control means. To prevent this action, I make use of the reactive coils 18, 19, 20 and 21, proportioned to saturate in response to such conditions and connected in series with the control devices. Instead of connecting the reactance in series I may also connect it in shunt to the control devices. Under such conditions, the fault current passing through the circuit of control means 14 saturates the reactance 18 and lowers the impedance of this circuit so that a larger percentage of the fault current passes through the control means 14 corresponding to the faulty feeder, thus reducing the current which can pass through the circuits of the other control means to an amount insufficient to cause their control devices to operate. In this way I maintain my control means selectively operative even under heavy fault conditions. Thus instead of the control device 14 corresponding to the faulty feeder taking three quarters of the fault current, this control means may take, for instance seven-eighths of the fault current and the remaining control means then each take one-eighth of the current.

As a further means for maintaining the selective action of my control means, I may connect the secondaries of transformers 10, 11, 12 and 13 to auxiliary transformers, the secondaries of which are adapted to saturate at small overload values. In Fig. 2 I have shown feeder 1 of the system of Fig. 1 having its transformer secondary 10 connected to auxiliary transformer 34 the secondary of which is adapted to be saturated. It is understood similar auxiliary transformers are connected to the other feeders and the secondaries of the auxiliary transformers are connected in series to form the loop circuit. By the use of auxiliary transformers which become saturated on small overload values I limit the current which can be induced into the loop circuit and hence prevent excessive fault currents from operating all the control devices. Under some conditions I may use both the auxiliary transformers and series reactance to maintain selectivity of the control means. Furthermore, by the use of auxiliary transformers I am able to ground each individual transformer as shown, instead of grounding the loop circuit.

In the modification shown in Fig. 2 I may also use, as desired, resistance elements in the loop circuit between the transformer secondaries and their respective shunt connections including the control means. Such an element 35 is shown so connected for transformer 34 of feeder 1. These resistance elements may be used as a further refinement in causing the auxiliary transformers to saturate and preventing passage of more than a certain amount of secondary current. Furthermore, by the use of this current limiting means, I am able to obtain the proper selective action by the use of control devices of the instantaneously operative type.

It is to be observed that if while feeder 1 is opened, another feeder becomes faulty, for instance feeder 2, that the fault currents take place as before described and by means of the selective action of the control means, the control means 15, corresponding to the faulty feeder 2 is operative to close the circuit of trip coil 23 and open the switch 7. The opening of this second feeder takes place in a similar manner to that already described.

What I claim as new and desire to secure by Letters Patent of the United States, is:

1. In combination with a plurality of parallel feeders, means selectively operative in response to a fault on any of said feeders for automatically opening the feeder at fault comprising transformers operatively related to each of said feeders, a loop circuit including the secondaries of said transformers in series, and control means for each in separate shunt circuits to the transformer secondary corresponding to that feeder, said control means being unresponsive to load currents in said loop circuit but selectively operative in response to unbalanced currents in said loop circuit to cause the opening of the feeder at fault.

2. In combination with a plurality of feeders, a loop circuit inductively related to all of said feeders for balancing out the effect of load currents induced therein, electroresponsive means for controlling the circuit of each feeder selectively operative in response to unbalanced currents in said loop circuit, said electroresponsive means for each feeder being connected in shunt to the other electroresponsive means in series whereby that means corresponding to a feeder at fault receives the greatest current.

3. In combination with a plurality of feeders, a loop circuit inductively related to all of said feeders for balancing out the effect of load currents induced therein, current responsive means controlling the opening of each feeder selectively operative in response to unbalanced currents in said loop circuit, said current responsive means for each feeder being arranged in shunt to the other current responsive means in series whereby the current through that means corresponding to a feeder at fault is sufficient to operate that means while the current through the other means is insufficient for operation.

4. In combination with a plurality of feeders, transformers operatively related to each of said feeders, a loop circuit including the secondaries of said transformers in series, and current responsive means for each feeder responsive to unbalanced currents in said loop circuit and so related that only that means corresponding to the feeder at fault receives sufficient current to operate.

5. In combination with a plurality of feeders, transformers operatively related to each of said feeders, a loop circuit including the secondaries of said transformers in series, and a control device in shunt to each secondary operative in response to unbalanced currents in said loop circuit above a predetermined amount, said control devices being so related that the current in all said devices except the one corresponding to a feeder at fault is always below said predetermined amount.

6. In combination with a plurality of feeders, transformers operatively related to each of said feeders, a loop circuit including the secondaries of said transformers in series, and control devices for each feeder in separate circuits in shunt to their corresponding transformers operative in response to unbalanced currents in said loop circuit above a predetermined amount, said devices being so related that the current reaches said predetermined amount only in that control device corresponding to the feeder at fault.

7. In combination with a plurality of parallel feeders, a loop circuit inductively related to all said feeders for balancing out the effect of load currents induced therein, current responsive means controlling the circuit of each of said feeders selectively operative in response to unbalanced currents in said loop circuit above a predetermined amount to open the circuit of the faulty feeder, and means coöperating with said current responsive means to maintain the action of said current responsive means selective under heavy unbalanced currents.

8. In combination with a plurality of feeders, a loop circuit inductively related to all said feeders for balancing out the effect of load currents induced therein, current responsive means controlling the circuit of each of said feeders selectively operative in response to unbalanced currents in said loop circuit above a predetermined amount for opening the circuit of the feeder at fault, means coöperating with said current responsive means for maintaining the action of said current responsive means selective under heavy unbalanced currents, and means responsive to the opening of any feeder for balancing the load currents induced in said loop circuit from said remaining feeders.

9. In combination with a plurality of feeders, transformers operatively related to each of said feeders, a loop circuit including the secondaries of said transformers in series, and control devices for each feeder in separate circuits in shunt to their corresponding transformers operative in response to unbalanced currents in said loop circuit above a predetermined amount, said devices being so related that the current exceeds said predetermined amount in only that device corresponding to the feeder at fault, and means for preventing the current through said other devices from reaching said predetermined amount upon excessive unbalanced currents.

10. In combination with a plurality of feeders, transformers operatively related to each of said feeders, a loop circuit including the secondaries of said transformers in series, and control devices for each feeder in separate circuits in shunt to their corresponding transformers operative in response to unbalanced currents in said loop circuit above a predetermined amount, said devices being so related that the current exceeds said predetermined amount in only that device corresponding to the feeder at fault, and means for maintaining said selective relation between said devices upon heavy unbalanced currents.

11. In combination with a plurality of parallel feeders, transformers operatively related to said feeders, a loop circuit including the secondaries of said transformers in series, electro-responsive means in separate shunt circuits to each transformer secondary selectively operative in response to unbalanced currents in said loop circuit above a predetermined amount to open the circuit of the feeder causing said unbalancing, reactance in series with each electroresponsive means to maintain the selective action of said means under heavy unbalanced currents, and means responsive to the opening of any feeder for removing from said loop circuit said transformer secondary, reactance and electroresponsive means corresponding to the feeder opened.

12. In combination with a plurality of parallel feeders, transformers operatively related to said feeders, a loop circuit including the secondaries of said transformers in series, current responsive means in separate shunt circuits to each transformer secondary selectively operative in response to unbalanced currents in said loop circuit above a predetermined amount, said means being so related that the current in only that means corresponding to the feeder at fault exceeds said predetermined amount, and means associated with said current responsive means operative in response to excessive unbalanced currents to maintain said selective action.

13. In combination with a plurality of parallel feeders, transformers operatively related thereto, a loop circuit of low resistance including the secondaries of said transformer in series, a circuit in shunt to each secondary, independent control means in each shunt circuit selectively operative in response to the unbalanced currents in said loop circuit above a predetermined amount to open the circuit of the feeder at fault, means in each of said shunt circuits for varying the impedance of its respective circuit, and means responsive to the opening of any feeder for maintaining the low resistance of said loop circuit.

14. In combination with a plurality of parallel feeders, a loop circuit, transformers operatively related to said feeders for supplying current to said loop circuit, control means selectively operative to open the circuit of any feeder at fault in response to fault currents in said loop, means operatively related to said transformers for limiting the current supplied to said loop, and means responsive to the opening of a feeder for excluding from said loop the control means corresponding to the feeder opened and the effect of its corresponding transformer.

In witness whereof, I have hereunto set my hand this first day of March, 1917.

OLIVER C. TRAVER.